Figure 1:
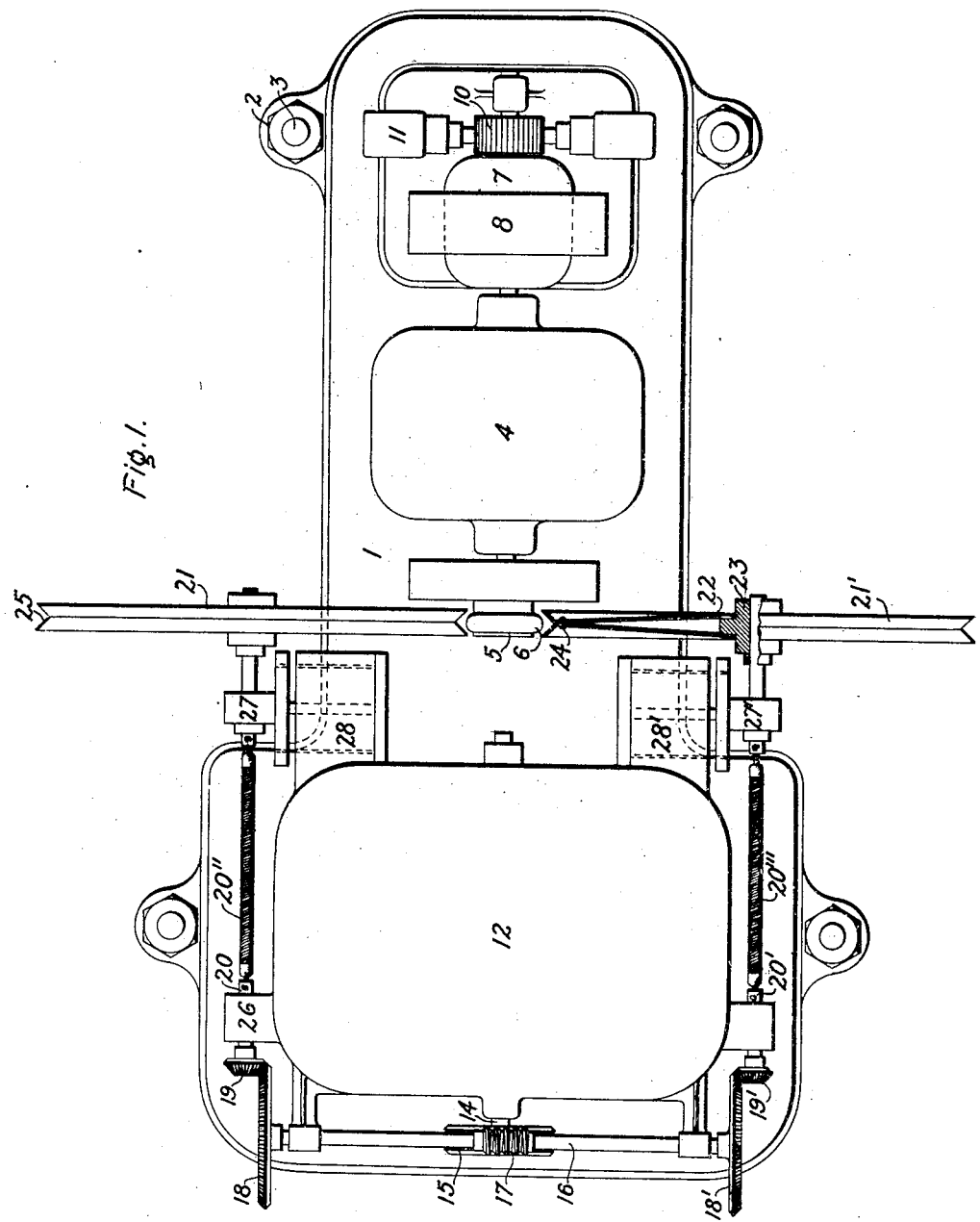

No. 770,017. PATENTED SEPT. 13, 1904.
W. S. MOODY.
AUTOMATIC REGULATOR.
APPLICATION FILED JAN. 9, 1903.
NO MODEL.
2 SHEETS—SHEET 1.

WITNESSES:
Harry A. Tilden.
Helen Orford

INVENTOR:
Walter S. Moody,
by Albert G. Davis
Att'y.

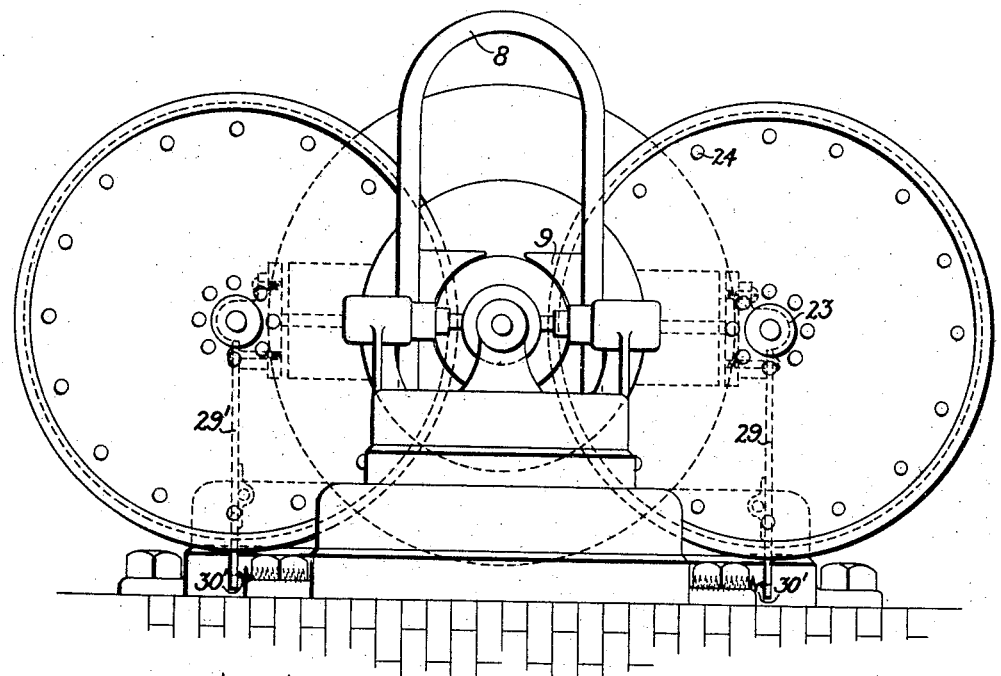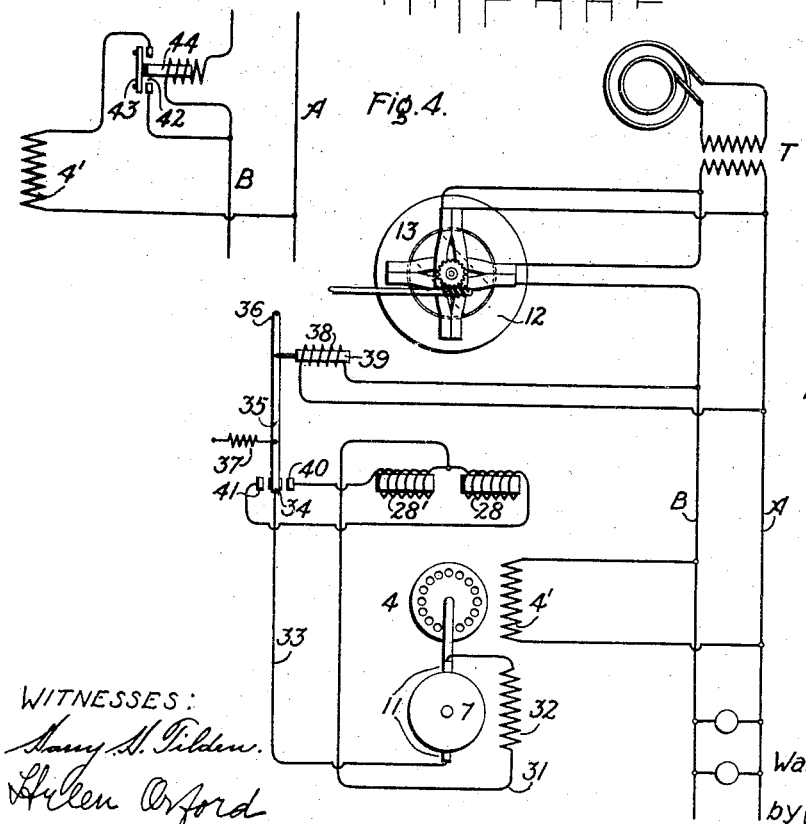

No. 770,017.

Patented September 13, 1904.

UNITED STATES PATENT OFFICE.

WALTER S. MOODY, OF SCHENECTADY, NEW YORK, ASSIGNOR TO GENERAL ELECTRIC COMPANY, A CORPORATION OF NEW YORK.

AUTOMATIC REGULATOR.

SPECIFICATION forming part of Letters Patent No. 770,017, dated September 13, 1904.

Application filed January 9, 1903. Serial No. 138,389. (No model.)

*To all whom it may concern:*

Be it known that I, WALTER S. MOODY, a citizen of the United States, residing at Schenectady, county of Schenectady, State of New York, have invented certain new and useful Improvements in Automatic Regulators, of which the following is a specification.

In cases where the voltage regulation of an alternating-current-supply system is not very close it is frequently desirable to employ some auxiliary regulating device. One instance in which such a regulator is particularly useful is found where the voltage on the system which supplies lighting-currents to offices, hotels, residences, and the like is irregular. The disagreeable results following from imperfect regulation in such cases are well understood. A regulator to be employed by a consumer to correct such irregular voltage of the supply system must possess the following characteristics: It must be automatic in action, simple, reliable, sensitive, and comparatively inexpensive.

The object of my present invention is the production of a regulator which will possess these characteristics.

My invention consists in certain features of arrangement and construction, more particularly pointed out in the claims annexed to and forming a part of this specification.

In the accompanying drawings, Figure 1 is a plan view, partly in section, illustrating one embodiment of my invention. Fig. 2 is an end view. Fig. 3 is a diagram showing the arrangement of the various circuits, and Fig. 4 is a diagrammatic view showing an additional feature.

A base 1, which may be of cast metal, forms a support for the major portion of the regulating mechanism. The base is provided with lugs 2, which may be perforated to receive bolts 3, by means of which the base is secured to the wall of the building or other suitable support. A small alternating-current motor 4, which may be of any suitable construction, provided it be self-starting, is mounted on the base. The shaft of this motor carries at one end a pulley or wheel 5. The bearing-surface of this pulley may be a friction-band 6, of rubber or other suitable material. The other end of the motor-shaft has mounted upon it the armature of a small direct-current generator 7. The field-magnet of this motor is preferably a permanent magnet to insure maximum efficiency and consists of a U-shaped yoke 8, provided with enlarged pole-pieces 9. The commutator 10 of this generator delivers current to the brushes 11. The base 1 also carries a potential-regulator 12, having a movable member 13, carried by a shaft 14. The shaft 14 carries at one end a worm-wheel 15. A shaft 16, suitably mounted, carries a screw 17, which meshes with the worm-wheel 15. Bevel-gears 18 and 18', respectively, are mounted on the ends of the shaft 16. These mesh with a pair of bevel-gears 19 and 19', respectively. The gears 19 and 19' are mounted at the ends of two similar shafts 20 and 20', respectively. The other ends of the shafts 20 and 20', respectively, carry wheels 21 and 21', respectively. The wheels 21 and 21' are similar in construction and are formed each of a pair of sheet-metal plates 22, which are spread apart at the central portion to embrace flanges on the hubs 23, and are secured together near their periphery by rivets 24. Beyond the rivets 24 the edges of the disk are shaped to form a V or trough shaped surface 25. The shafts 20 and 20' have a central flexible portion 20'' and 20'''. These shafts are journaled in fixed bearings 26 adjacent to the ends carrying the gears 19 and 19', respectively. The other ends of the shafts are mounted in bearings carried by the movable cores 27 and 27', respectively, of electromagnets 28 and 28', respectively. When either of the cores 27 or 27' is attracted by its electromagnet, the corresponding wheel 21 or 21', respectively, is moved so that its trough-shaped periphery engages the bearing-ring 6 of the pulley 5, whereupon the disk and its shaft are rotated by the frictional engagement with the pulley 5. Normally, however, the wheels 21 and 21' are held out of engagement with the pulley 5 by means of levers 29 29' and springs 30 30'.

Referring now to the diagram of Fig. 3, T represents a transformer or other source of energy for supplying current to the lines A and B. One of the coils of the potential-regulator 12 is connected in series with line B. The other coil of the potential-regulator is shunted across the lines A and B. The winding 4' of the motor 4 is shunted across the lines A and B. A line 31 connects one of the brushes 11 of the generator 7 to one of the terminals of each of the coils 28 and 28' through a resistance 32. A line 33, leading from the other brush of the generator, is connected to a movable contact-piece 34. The contact-piece 34 is shown as carried at one end of a lever 35, pivoted to some fixed support at 36 and normally pulled in one direction by a spring 37. The lever 35 is moved in the opposite direction by an attraction between an electromagnet 38 and its core 39. The core of the electromagnet is connected to the lever 35 in any suitable manner, and the winding of the electromagnet is in shunt across the lines A and B. The contact 34 plays between fixed contacts 40 and 41, respectively, and engages one or the other as the electromagnet overbalances the spring 37, or vice versa. The contacts 40 and 41 are connected to the free terminals of the coils 28 and 28', respectively.

The operation of my device is as follows: On the passage of current through the line B the motor 4 will be rotated, and on an increase of voltage between the lines A and B the electromagnet 38 will overcome the spring 37, and the contact 34 will be moved into engagement with the contact 40. This will energize the electromagnet 28', thus throwing the wheel 21' into engagement with the friction-band 6 on the pulley 5. This by engagement between the gears 19' and 18' and the screw 17 and worm-wheel 15 will rotate the member 13, so as to change the mutual inductive relation between the coils of the regulator in a manner to lower the voltage. When the voltage has been lowered the desired amount, the attraction between the electromagnet 38 and its core 39 will be balanced by the spring 37, and the lever 35 will move back into the intermediate position. (Shown in Fig. 3.) If the voltage falls too low, the contact 34 will be moved into engagement with the contact 41, and the electromagnet 28 will be energized. This will throw the wheel 21 into engagement with the pulley 5 and will rotate the inductance-changing member 13 in an opposite direction from that in which it was moved when the wheel 21' was in engagement with the pulley 5. This is continued until the voltage is raised to the proper amount, when the lever 35 will again move into the intermediate position. (Shown in Fig. 3.)

I have employed a direct-current generator to furnish the current for energizing the electromagnets 28 28' in preference to taking alternating current from the lines A and B for that purpose, as thereby a simpler and more efficient construction and operation are obtained. If alternating current from the lines A and B is employed to energize these electromagnets, the volt-amperes required are eight or ten times that required with direct current unless condensers are used. The use of condensers adds to the cost of the apparatus and complicates its operation.

In order to prevent useless consumption of current by the motor 4, I have devised the arrangement shown in Fig. 4, in which the line including the winding 4' of the motor is normally open at 42, but is adapted to be closed by the armature 43 of an electromagnet 44. The winding of the electromagnet 44 is placed in the supply-line B, and the force tending to hold the armature in the position shown in the drawings, which may be gravity, a spring, or the like, may be so proportioned that the motor-circuit will be closed only upon the passage of a certain predetermined current due to the supply system. The current which will be sufficient to close the motor-circuit may be that due to the operation of one, two, or more lamps, according to the circumstances existing where the device is employed.

What I claim as new, and desire to secure by Letters Patent of the United States, is—

1. In an electric system, a voltage-changer, a motor-generator, a device responsive to the condition of said system, and means controlled thereby for establishing an operative connection between said changer and the motor-generator.

2. In combination, a voltage-changer, a continuously-running motor, a direct-current generator driven by the motor, and means actuated by energy derived from the generator for connecting the motor to the voltage-changer.

3. In combination, a voltage-changer, a continuously-rotating disk and a continuously-rotating direct-current generator, a pair of rotatable disks adjacent to the first-mentioned disk, each connected to the voltage-changer so that a rotation of either disk will operate the voltage-changer, and means actuated by energy derived from the direct-current generator for throwing one or the other of these disks into contact with the continuously-rotating disk.

4. In an alternating-current-supply system, a voltage-changer, an alternating-current motor, a direct-current generator driven by the motor, a pair of electromagnets, a relay adapted to connect one or the other of the electromagnets to the direct-current generator according as the voltage rises or falls beyond predetermined limits, and means operated by the electromagnets for connecting the voltage-changer to the continuously-rotating motor so that the voltage-changer will operate to raise the voltage or lower the voltage according to which electromagnet is connected to the generator.

5. In an alternating-current-supply system, a voltage-changer, means for operating it, and means independent of said operating means for rendering the latter ineffective when the current in said system falls below a predetermined minimum.

6. In an automatic potential-regulator, a movable voltage-changing member, a continuously-rotating member, a pair of flexible shafts each connected at one end to the voltage-changing member and each carrying at the other end a disk, and means for moving one or the other of these disks into engagement with the continuously-rotating member accordingly as the voltage-changer is to be operated to raise the voltage or to lower the voltage.

7. In an electric system, a voltage-changer, operating means therefor the operation of which is not directly affected by ordinary variations of current in said system, and means for rendering said operating means inoperative when the current in said system falls below a predetermined minimum.

8. In an alternating-current system, a voltage-changer, an alternating-current motor running at substantially constant speed, a direct-current generator driven thereby, and means energized by the current from said generator for establishing an operative connection between the motor and the voltage-changer.

9. In an electric system, a voltage-changer, a motor, a generator, a device responsive to the condition of said system, and means controlled thereby for establishing an operative connection between the motor and the voltage-changer, said means being actuated by energy derived from the generator.

10. In an alternating-current system, a voltage-changer, an alternating-current motor, a direct-current generator driven thereby, electromagnetic means for establishing an operative connection between the motor and the voltage-changer, said means being energized by the current from said generator, and a potential responsive device controlling the circuit connections between said generator and electromagnetic means.

In witness whereof I have hereunto set my hand this 8th day of January, 1903.

WALTER S. MOODY.

Witnesses:
 BENJAMIN B. HULL,
 HELEN ORFORD.